US011068377B2

(12) United States Patent
Walenstein et al.

(10) Patent No.: US 11,068,377 B2
(45) Date of Patent: *Jul. 20, 2021

(54) CLASSIFYING WARNING MESSAGES GENERATED BY SOFTWARE DEVELOPER TOOLS

(71) Applicant: BlackBerry Limited, Waterloo (CA)

(72) Inventors: Andrew Walenstein, Issaquah, WA (US); Andrew James Malton, Waterloo (CA); Jong Chun Park, Grapevine, TX (US); Hanyang Hu, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,625

(22) Filed: Sep. 27, 2019

(65) Prior Publication Data
US 2020/0026636 A1 Jan. 23, 2020

Related U.S. Application Data

(63) Continuation of application No. 15/725,250, filed on Oct. 4, 2017, now Pat. No. 10,430,315.

(51) Int. Cl.
G06F 11/36 (2006.01)
G06N 20/00 (2019.01)
(Continued)

(52) U.S. Cl.
CPC .......... G06F 11/362 (2013.01); G06F 8/43 (2013.01); G06F 11/36 (2013.01); G06N 5/003 (2013.01); G06N 20/00 (2019.01); G06N 20/20 (2019.01)

(58) Field of Classification Search
CPC .................................................... G06F 11/362
(Continued)

(56) References Cited

U.S. PATENT DOCUMENTS 6,745,383 B1 * 6/2004 Agarwal ............. G06F 11/3495
714/39
6,785,848 B1 8/2004 Glerum et al.
(Continued)

OTHER PUBLICATIONS

Alikhashashneh, Enas A., Rajeev R. Raje, and James H. Hill. "Using Machine Learning Techniques to Classify and Predict Static Code Analysis Tool Warnings." 2018 IEEE/ACS 15th International Conference on Computer Systems and Applications (AICCSA). IEEE, 2018.pp. 1-8 (Year: 2018).*
(Continued)

Primary Examiner — Satish Rampuria
(74) Attorney, Agent, or Firm — Fish & Richardson P.C.

(57) ABSTRACT

A method for classifying warning messages generated by software developer tools includes receiving a first data set. The first data set includes a first plurality of data entries, where each data entry is associated with a warning message generated based on a first set of software codes, includes indications for a plurality of features, and is associated with one of a plurality of class labels. A second data set is generated by sampling the first data set. Based on the second data set, at least one feature is selected from the plurality of features. A third data set is generated by filtering the second data set with the selected at least one feature. A machine learning classifier is determined based on the third data set. The machine learning classifier is used to classify a second warning message generated based on a second set of software codes to one of the plurality of class labels.

17 Claims, 3 Drawing Sheets

(51) Int. Cl.
    *G06N 20/20* (2019.01)
    *G06F 8/41* (2018.01)
    *G06N 5/00* (2006.01)
(58) Field of Classification Search
    USPC .................................................. 717/120–167
    See application file for complete search history.

(56) References Cited

U.S. PATENT DOCUMENTS

| | | | |
|---|---|---|---|
| 6,978,443 | B2 | 12/2005 | Flanagan et al. |
| 7,546,320 | B2* | 6/2009 | Jenkins ..................... G06F 8/70 |
| 2003/0131284 | A1* | 7/2003 | Flanagan ................... G06F 8/75 |
| | | | 714/38.1 |
| 2004/0230955 | A1* | 11/2004 | Pugh ........................ G06F 9/454 |
| | | | 717/124 |
| 2010/0023928 | A1* | 1/2010 | Hentschel ........... G06F 11/3604 |
| | | | 717/124 |
| 2017/0212829 | A1 | 7/2017 | Bales et al. |

OTHER PUBLICATIONS

Lee, Seongmin, et al. "Classifying false positive static checker alarms in continuous integration using convolutional neural networks." 2019 12th IEEE Conference on Software Testing, Validation and Verification (ICST). IEEE, 2019.pp. 391-401 (Year: 2019).*

Ayewah, Nathaniel, et al. "Evaluating static analysis defect warnings on production software." Proceedings of the 7th ACM SIGPLAN-SIGSOFT workshop on Program analysis for software tools and engineering. 2007.pp. 1-7 (Year: 2007).*

Ghazarian, Arbi, Mehdi Sagheb Tehrani, and Arin Ghazarian. "A software requirements specification framework for objective pattern recognition: Aset-theoretic classification approach." 2011 16th IEEE International Conference on Engineering of Complex Computer Systems. IEEE, 2011.pp. 211-220 (Year: 2011).*

Couto, Cesar, et al. "Static correspondence and correlation between field defects and warnings reported by a bug finding tool." Software Quality Journal 21.2 (2013): pp. 241-257. (Year: 2013).*

Khalaf, Mohammed, et al. "Advance flood detection and notification system based on sensor technology and machine learning algorithm." 2015 International Conference on Systems, Signals and Image Processing (IWSSIP). IEEE, 2015.pp. 105-108 (Year: 2015).*

Communication Purusuant to Article 94 (3) EPC issued in European Application No. 18198499.8 dated Feb. 7, 2020, 4 pages.

Non-Final Office Action issued in U.S. Appl. No. 15/725,250 dated Jan. 24, 2019, 22 pages.

Interview Summary issued in U.S. Appl. No. 15/725,250 dated May 23, 2019, 1 page.

Notice of Allowance issued in U.S. Appl. No. 15/725,250 dated May 23, 2019, 17 pages.

Aggarwal and Jalote, "Integrating static and dynamic analysis for detecting vulnerabilities," proceedings of the 30th Annual International Computer Software and Applications Conference (COMPSAC'06), Sep. 17-21, 2006, 8 pages.

Allier et al., "A Framework to Compare Alert Ranking Algorithms," 2012 19th Working Conference on Reverse Engineering, Oct. 2012, 9 pages.

Chen et al., "Using Random Forest to Learn Imbalanced Data," University of California, Berkley, Jan. 2004, 12 pages.

github.com' [online], "Unbalanced-learn," available on or before Aug. 10, 2016, [retrieved on Apr. 23, 2018], retrieved from URL: <https://github.com/scikit-learn-contrib/imbalanced-learn/wiki>, 2 pages.

Hanam et al., "Finding patterns in static analysis alerts: improving actionable alert ranking," ACM, (Presented at the 11th Working Conference on Mining Software Repositories) May 31, 2014, 10 pages.

Heckman and Williams, "A Model Building Process for Identifying Actionable Static Analysis Alerts," IEEE (Presented at the 2009 International Conference on Software Testing Verification and Validation), Apr. 1-4, 2009, 10 pages.

Heckman and Williams, "On Establishing a Benchmark for Evaluating Static Analysis Alert Prioritization and Classification Techniques," ESEM '08, Oct. 9-10, 2008, 10 pages.

Jung et al., "Taming False Alarms from a Domain-Unaware C Analyzer by a Bayesian Statistical Post Analysis," Reasearch on Program Analysis System (ROPAS) Memo, Apr. 26, 2005, 12 pages.

Kim and Ernst, "Prioritizing Warning Categories by Analyzing Software History," Fourth International Workshop on Mining Software Repositories, (MSR'07), May 20-26, 2007, 4 pages.

Kremenek et al., "Correlation Exploitation in Error Ranking," ACM SIGSOFT Software Engineering Notes, Sep. 2004, 12 pages.

Ogasawara et al., "Experiences with program static analysis," IEEE, Sofware Metrics Symposium, Dec. 1998, 4 pages.

Ruthruff et al., "Predicting accurate and actionable static analysis warnings," IEEE, Software Engineering (Presented at the International Conference on Software Engineering 2008 ACM/IEEE 30th International Conference) May 10-18, 2008, 10 pages.

Shen et al., "EFindBugs: Effective Error Ranking for FindBugs," IEEE, 2011 IEEE Fourth International Conference on Software Testing, Verification and Validation, Mar. 21-25, 2011, 10 pages.

Tantithamthavorn et al., "The impact of Mixlabelling on the Performance and Interpretation of Defect Prediction Models," presented at the 2015 IEEE/AMC 37th IEEE International Conference on Software Engineering, Aug. 25-29, 2015, 12 pages.

Williams and Hollingsworth, "Automatic Mining of Source Code Repositories to Improve Bug Finding Techniques,", IEEE Transactions on Software Engineering, vol. 31, No. 6, Jun. 2005, 15 pages.

Xiao and Pham, "Performing High Efficiency Source Code Static Analysis with Intelligent Extensions," proceedings of the 11th Asia-Pacific Software Engineering Conference, APSEC '04, Nov. 30-Dec. 3, 2004, 10 pages.

Yi et al., "An empirical study on classification methods for alarms from a bug-finding static C analyzer," Information Processing Letters vol. 102, Apr. 30, 2007, 6 pages.

Yuksel and Sozer, "Automated Classification of Static Code Analysis Alerts: A Case Study," 2013 IEEE International Conference on Software Maintenance, Sep. 22-28, 2013, 4 pages.

Ayewah et al., "Evaluating static anaylsis defect warning on production sofeware," proceedings of the 7th ACM SIGPLAN-SIGSOFT workshop on Program analysis for software tools and engineerings, ACM, 2007.

Padgham et al., "Model-based test oracle generation for automated unit testing of agent systems," IEEE Transaction on Software Engineering, vol. 39, Issue 9, 2013.

Hanam et al., "Finding patterns in static analysis alerts: improving actionable alert ranking," Mining Software Repositories, Jan. 1, 2014, pp. 152-161, 10 Pages.

Heckman et al., "A Systematic Literature Review of Actionable Alert Identification Techniques for Automated Static Code Analysis,"Information and Software Tec hnology, Elsevier, Amsterdam, NL, vol. 53, No. 4, Dec. 19, 2010, pp. 363-387, 25 pages.

Extended European Search Report issued in European Application No. 18198499.8 dated Mar. 6, 2019, 10 pages.

* cited by examiner

CLASSIFYING WARNING MESSAGES GENERATED BY SOFTWARE DEVELOPER TOOLS

CROSS-REFERENCE TO RELATED APPLICATIONS

This application is a continuation of and claims the benefit of U.S. application Ser. No. 15/725,250, filed on Oct. 4, 2017, the entire contents of which are hereby incorporated by reference.

TECHNICAL FIELD

The present disclosure relates to classifying warning messages generated by software developer tools.

BACKGROUND

In some cases, software developers use software developer tools, such as fault finding tools, to analyze or execute software codes to identify potential flaws in software programs. The fault finding tools can generate warning messages for the identified flaws.

DESCRIPTION OF DRAWINGS

Like reference numbers and designations in the various drawings indicate like elements.

DETAILED DESCRIPTION

Figure 1:
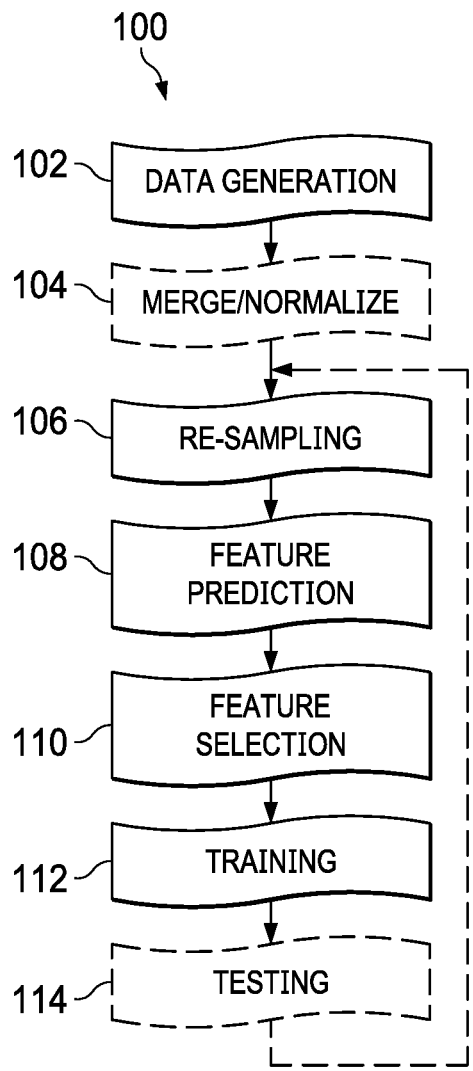
FIG. 1 is a flow diagram illustrating an example process for classifying warning messages generated by software developer tools, according to an implementation.

Software developer tools, such as fault finding tools (FFTs), can identify potential flaws in software programs. In some cases, FFTs can generate a large number of warning messages for either incorrectly identified flaws or unimportant flaws that can be ignored by software developers, and only a small number of warning messages are for real flaws that need to be fixed by the software developers. Therefore, the software developers usually have to spend time to triage the warning messages to determine which warning messages to fix. One reason for generating such a large number of unimportant warning messages is that the FFTs typically consider the software program code itself without considering contexts of the software program. Contexts of a software program can include, for example, a development history of the software program that indicates whether a particular warning message was fixed or ignored by software developers in the past. Contexts of a software program can also include a programming language used in the software program (for example, C, C++, or java), an application type of the software program (for example, whether the software program is for a mobile app, a database application, or a server application), a size of the software program (for example, a number of files or a number of lines in the software program), libraries used in the software program, and other context information consistent with this disclosure.

In some cases, a classifier can be used to learn patterns of ignored warning messages and fixed warning messages from the development history (i.e., software developers' actions of fixing or ignoring previously generated warning messages from prior runs of the FFT on previous versions of the software program). After learning the patterns, the classifier can be used to predict whether to fix or ignore a new warning message. In other words, the classifier can classify a warning message to one of two classes with class labels of "fix" and "ignore." The classifier can be a software tool or a program routine for classifying a warning message. For the classifier to learn the patterns, a data set can be generated based on the development history. The data set can include multiple data entries. Each data entry is associated with a prior warning message and a class label of "fix" or "ignore" indicating whether the software developers have fixed or ignored that prior warning message. In other words, the class label for each data entry is known. As discussed above, frequently most of the warning messages are ignored by the software developers and a small number of warning messages are fixed. As a result, the data set has a class imbalance. In other words, a majority of the data entries in the data set are associated with one class (i.e., the class of "ignore," called a majority class), and a minority of data entries are associated with another class (i.e., the class of "fix," called a minority class). An imbalanced data set is not effective for the classifier to learn patterns because the classifier does not have enough data samples to learn patterns of the minority class. Training the classifier using an imbalanced data set can generate a classifier that tends to classify future warnings into the majority class and generates many false negatives (i.e., predict a warning as "ignore" while the warning should be classified as "fix"), affecting a recall rate (i.e., a percentage of correctly predicted "fix" instances out of a total true "fix" instances). In addition, an imbalanced data set is not effective for selecting a good set of features to include in the classifier. Existing approaches of evaluating features (so called "feature-set reduction") typically rank features useful for identifying the majority class over features useful for identifying the minority class.

At a high level, the described approach generates an accurate classifier using machine learning methods for an imbalanced data set. For overcoming the imbalanced data set issue, the described approach augments the imbalanced data set by sampling the data set so that the sampled data set is approximately balanced or a difference between the numbers of data entries in a majority class and in a minority class is below a threshold. In some implementations, if the classifier does not provide a good performance, a feedback mechanism can be used to re-sample the imbalanced data set by a different sampling method to adjust learning for the classifier.

In some implementations, from a development history of a software program, information of various features of the software program associated with warning messages can be collected to form a data set. As discussed above, the data set can be imbalanced and include multiple data entries. Each data entry is associated with a warning message and a class label of "fix" or "ignore." Each data entry can include values of a number of features of the software program associated with the corresponding warning message. As will be discussed more below, for example, a warning message is related to a code error on a specific line of a specific file in the software program. The features included in the data entry can be a number of lines of that specific file, a number of lines added or deleted in a most recent code change in that specific file, and any other suitable information about that specific file. Other example features in the data entry are illustrated in Table 1 below.

For generating an accurate classifier, a subset of features that provides relevant information towards the warning message classification are selected. To enable selecting a good set of features, the imbalanced data set is sampled to generate an approximately balanced data set. The balanced data set is used for feature selection. Different from existing machine learning methods which sample the data set after the feature selection, the described approach sample the imbalanced data set before the feature selection.

After the feature selection, the balanced data set is filtered by removing unselected features. The filtered data set is then divided into two sets, a training data set and a testing data set. The training data set is used to generate and train a classifier to learn the patterns of fixed warning messages and ignored warning messages, while the testing data set is used to evaluate a performance of the classifier. If the classifier does not provide a good performance, a feedback mechanism is used so that the original imbalanced data set is re-sampled using a different sampling method. The re-sampled data set is then used for selecting possibly a different subset of features, and the classifier is re-trained and re-tested. In some implementations, if the feedback mechanism is not used, no testing data set is needed for evaluating the classifier performance, and the entire filtered data set can be used as the training data set.

After learning the patterns of fixed warning messages and ignored warning messages, the classifier can be used to classify a new warning message. For example, when the software program is further developed with new codes, a new warning message can be generated by applying the FFT on the further developed software program. Values of the selected features associated with the new warning messages are collected. The collected feature values are provided to the classifier, and the classifier outputs a class label for the new warning message. If the classifier classifies the warning message as "ignore," the warning message may not be presented to the software developers. In some cases, the output class labels from the classifier can serve as inputs to a software tool, for example, a filter to filter out the "ignore" messages.

In some cases, a new software program may not have sufficient data entries for a classifier to learn patterns of fixed warning messages and ignored warning messages because of a small number warning messages generated during a short software development history. In these cases, data sets from other software programs can be merged with a data set from the new software program. The merged data set can be used to generate a classifier for the new software program. In some implementations, for each software program to be similarly represented in the merged data set, a normalization can be performed so that a size of a large data set is reduced to a similar size of a small data set.

The described approach can also be applied to a classifier and a data set of more than two classes. For example, data entries in a data set can be associated with more than two classes. If a ratio of a number of data entries in one class to a number of data entries in another class is more than a threshold, the data set can be considered to be imbalanced. Sampling methods can be used to sample the data set so that each class has a similar number of data entries.

In operation, a first data set can be received. The first data set includes a first plurality of data entries, where each data entry is associated with a warning message generated based on a first set of software codes. Each data entry also includes indications for a plurality of features, and is associated with one of a plurality of class labels. A second data set can be generated by sampling the first data set. Based on the second data set, at least one feature can be selected from the plurality of features. A third data set can be generated by filtering the second data set with the selected at least one feature. A machine learning classifier can be automatically determined based on the third data set. The machine learning classifier can be used to classify a second warning message generated based on a second set of software codes to one of the plurality of class labels, where the second set of software codes is different than the first set of software codes. The plurality of class labels can include a first class label for fixing the warning message and a second class label for ignoring the warning message. The first data set can be an imbalanced data set. The plurality of features can include features associated with at least one of a software development process, a programming code, a software code change, or a fault finding tool analysis. The at least one feature can be selected based on a cut-off value. The first data set can be sampled using at least one of over-sampling a minority class or under-sampling a majority class. The third data set can be divided into a training data set and a testing data set, where the training data set is used to determine the machine learning classifier, and the testing data set is used to evaluate a performance of the machine learning classifier. A stratified sampling or a stratified K-fold sampling can be applied to the training data set. The machine learning classifier can be a weighted random forest classifier In some implementations, the first data set can be sampled using a first sampling method. In response to determining that the performance of the machine learning classifier is lower than a threshold, a different second data set can be generated by sampling the first data set using a different sampling method. Different at least one feature can be selected from the plurality of features based on the different second data set. A different third data set can be generated by filtering the different second data set with the different selected feature. A different machine learning classifier can be determined based on the different third data set. The second warning message can be classified to one of the plurality of class labels using the different machine learning classifier. In some implementations, a second plurality of data entries generated based on a third set of software codes can be received, where the second plurality of data entries have more data entries than the first plurality of data entries. The second plurality of data entries can be modified by removing a set of data entries. The modified second plurality of data entries can be included in the first data set.

The classification of warning messages described herein can use a software tool or a program routine to automatically classify a large number of warning messages generated by FFTs, and reduce a number of warning messages presented to software developers. The described approach can generate an accurate classifier to classify warning messages using an imbalanced data set. For example, the described approach can improve the classifier's performance metrics for an imbalanced data set that has a size ratio of 9:1 for a majority class and a minority class, in particular improving a performance metric of recall for the class of "fix." In addition, the described approach can also generate an accurate classifier for a new software program that does not have enough data entries to learn patterns of fixed warning messages and ignored warning messages. FIGS. 1-4 and associated descriptions provide additional details for these implementations.

FIG. 1 is a flow diagram illustrating an example process 100 for classifying warning messages generated by software developer tools, according to an implementation. For clarity of presentation, the description that follows generally describes process 100 in the context of the other figures in this description. However, it will be understood that process 100 may be performed, for example, by any suitable system, environment, software, and hardware, or a combination of systems, environments, software, and hardware, as appropriate. For example, process 100 can be performed by the example computer system 400 illustrated in FIG. 4. In some implementations, some steps of process 100 can be run in parallel, in combination, in loops, or in any order.

At 102, a data set can be generated from a development history of a software program. The data set can include multiple data entries. Each data entry is associated with a warning message and a class label. As will be discussed below, each data entry includes values of a number of features associated with the corresponding warning message. In some implementations, the data set can be in a table format. Each row in the table is a single data entry. Each column indicates a feature of the data entry.

In some implementations, historical versions of software program codes can be obtained from a revision control tool. The FFT can be applied on the historical versions of the software program to generate a list of warning messages. For each warning message, a class label is determined based on whether the software developers had fixed or ignored that warning message. In addition, as discussed in FIG. 2, values of various features related to that warning message can be collected, for example, by a revision control tool and an FFT. The data set can include features from, but not limited to, a number of categories such as process features, code features, churn features, and FFT features as shown in Table 1.

TABLE 1

Features in a data set

| | Description | Examples |
|---|---|---|
| Process features | Characteristics drawn from software development process | Number of commits<br>Number of neighbor's commits<br>Number of normalized lines |
| Code features | Characteristics drawn from software itself | Number of classes<br>Number of files<br>Number of lines |
| Churn features | Characteristics drawn from recent changes of software | Number of lines added<br>Number of lines deleted |
| FFT features | Characteristics drawn from an FFT analysis | Severity<br>Line number |

For example, assume that a warning message indicates an error on a specific line in a particular code file. As shown in Table 1, the process features can capture characteristics from the software development process, for instance, a number of commits in the particular code file. The code features can capture characteristics from the software code itself, for example, a number of lines in the particular code file. The churn features can capture characteristics of recent changes of the software code, for example, a number of code lines added or deleted in the particular code file in a most recent code change prior to the warning message was generated. The FFT features can capture characteristic from the FFT analysis, for example, a line number and an error severity indicated in the warning message.

As another example, assume that the data set includes the churn features and the FFT features shown in Table 1. As a result, the data set can be a table having four columns with column names of "churn feature: number of lines added," "churn feature: number of lines deleted," "FFT feature: severity," and "FFT feature: line number." Assume that a particular warning message indicates a fatal error on line 10 of a specific code file, and that in a most recent code change prior to the warning message zero lines were added and three lines were deleted from the specific code file. In that case, the data entry for that particular warning message includes feature values of 0, 3, "fatal," and 10 for the four feature columns. In addition, a class label is associated with that data entry based on whether the software developers had fixed the particular warning message.

Figure 2:
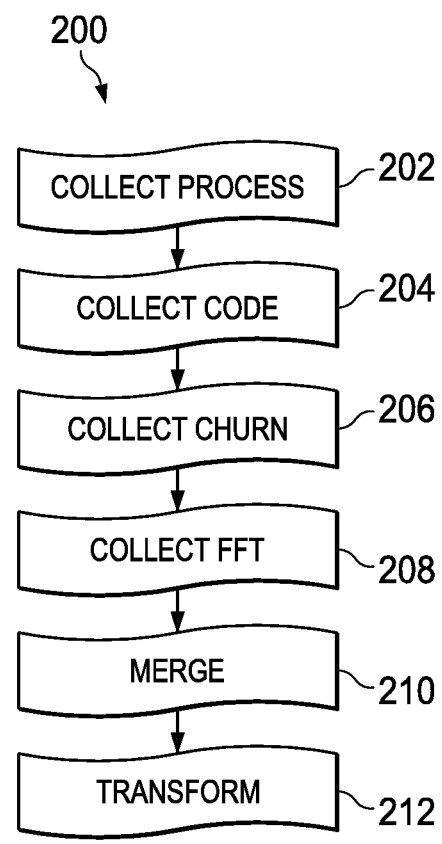
FIG. 2 is a flow diagram illustrating an example process for generating a data set, according to an implementation.

FIG. 2 is a flow diagram illustrating an example process 200 for generating a data set, according to an implementation. For clarity of presentation, the description that follows generally describes process 200 in the context of the other figures in this description. However, it will be understood that process 200 may be performed, for example, by any suitable system, environment, software, and hardware, or a combination of systems, environments, software, and hardware, as appropriate. In some implementations, various steps of process 200 can be run in parallel, in combination, in loops, or in any order.

At 202, 204, 206, and 208, values of process features, code features, churn features, and FFT features, are respectively collected for each warning message by, for example, a revision control tool or an FFT. At 210, the collected feature values are merged into, for example, a table format. At 212, the merged feature values are transformed to a data set. For example, the transformation can convert non-number feature values (such as the error severity feature discussed above whose feature value can be a character string) to numbers so that a classifier can manipulate easily. In some cases, a mapping from one set of codes (non-number) to another set of codes (numbers) can be achieved by a simple fixed function.

Turning back to FIG. 1, in some cases, different software programs can have different contexts. For example, a flaw that needs to be fixed in one software program can be ignored in another software program. However, in some cases, different software programs can have similar contexts, that is, the software developers treat the flaws similarly in those software programs. Two software programs can have similar contexts if, for example, the two software programs are written in similar programming languages, have similar application types (for instance, both software programs are for mobile apps), have similar sizes, or use similar libraries.

In some instances, a new software program may not have enough data entries for a classifier to learn patterns of fixed warning messages and ignored warning messages because of a small number warning messages generated during the short software development history. At 104, data sets collected from other software programs that have similar contexts can be merged with the data set from the new software program so that the merged data set can have a decent size to generate a classifier for the new software program. In other words, old learning histories from other software programs can be used for the new software program whose data set size is not large enough to generate a classifier for itself. If a software program has enough data entries for generating a classifier, then step 104 is not performed.

In some implementations, when multiple data sets of different sizes are merged, a normalization can be performed. The number of data entries in a data set is considered to be the size of the data set. Normalization reduces the size of a big data set to a similar size of a small data set, for example, by removing some data entries from the big data set. For instance, if the big data set is an imbalanced data set, some data entries from the majority class can be removed. In some implementations, a normalization tolerance level can be set to ignore the size discrepancy up to a predefined level. For example, a normalization tolerance level of 5% can be set. That is, no normalization is performed if two data sets differ by 5% or less in size. The normalized data sets are merged together to build a new data set. Normalizing multiple data sets to a similar size can reduce a sampling bias. A sampling bias can be presented if in the merged data set one software program has significantly more data entries than another software program.

As discussed above, in some cases, the data set can have a class imbalance. That is, the data entries in the data set are heavily biased to one specific class label. For example, most of the data entries (e.g., 90%) in the data set are associated with the class label "ignore," while a small number of data entries (e.g., 10%) are associated with the class label "fix." In some cases, a data set is considered to have a class imbalance if a ratio of the number of data entries associated with one class label to the number of data entries associated with another class label exceeds a threshold. The class imbalance makes learning ineffective for the classifier because of the small pool of data entries for the classifier to learn patterns of the minority class.

At 106, a sampling is performed to reduce the imbalance in the data set so that the different classes in the data set have a similar number of data entries to enable an effective learning for the classifier. As will be discussed below, the described approach can have a feedback loop. For example, an initial sampling method can be used to determine an initial classifier. If the initial classifier does not provide a good performance, a different sampling method can be used to determine a different classifier that may have a better performance. Various sampling methods can be used, for example, over-sampling the minority class, under-sampling the majority class, and a combination of over-sampling the minority class and under-sampling the majority class.

A number of under-sampling methods can be used, for example, random majority under-sampling, under-sampling with cluster centroids, and extraction of majority-minority Tomek links. For example, the under-sampling with cluster centroids method under-samples the majority class by replacing a cluster of majority data entries with the cluster centroid (middle of a cluster) of a k-means algorithm. The random majority under-sampling method under-samples the majority class by randomly picking samples with or without replacement.

A number of over-sampling methods can also be used, for example, random minority over-sampling with replacement, synthetic minority over-sampling technique, and adaptive synthetic sampling approach. A basic under-sampling method can simply remove some data entries, while a basic over-sampling method can simply repeat some data entries. Different from existing approaches, the described approach samples the imbalanced data set before feature prediction and selection as described in 108 and 110, providing a better feature selection to enable an effective classifier learning. Existing approaches typically apply sampling after feature prediction and selection.

As discussed in Table 1, the data set generated in 102 can include a large number of features. In some cases, a subset of features provides relevant information to the classification problem of the classifier, while other features provide irrelevant or redundant information. Therefore, for enabling an effective learning for the classifier, a subset of features relevant to the classification problem can be selected, while the irrelevant or redundant features can be removed. For improving a performance and reducing a complexity of the classifier, usually a small number of features that capture information relevant to the classification problem are selected.

At 108, feature prediction can be performed to determine features that are not correlated to learning patterns of fixed warning messages and ignored warning messages so that these features can be excluded from the classifier. In some implementations, a dendrogram algorithm called a variable clustering can be used along with a variable importance using both Mean Decrease Gini and Mean Decrease Accuracy, and a correlation matrix. In some implementations, a developer tool can read in the software program and generates a list of metrics for the code (e.g., number of lines in a particular program element). The metrics are mapped to the lines of the program being analyzed. If there is a warning associated with line L of program P, and the developer tool determines that at line L of program P the value for the metric "lines of code in the program element" is V, then V is the prediction feature. In some implementations, defect prediction measures can be calculated based on the development history, such as number of lines of change in the program location in a predetermined time period (e.g., the last three months). Typically, program parts that are under constant change may have more defects. If a warning is issued by the FFT associated with those rapidly-changing parts, it might be more likely to be a valid warning compared to a different warning that is associated with an area of code that does not change quickly.

At 110, features that are relevant to the classification problem are selected. In some implementations, a variable clustering method can be used, where one distinct and representative feature is determined from each cluster based on a cut-off Spearman value. The cut-off Spearman value can be predetermined by a system operator or an algorithmic process. In the case where a single feature is clustered (e.g., in the dendrogram) above the cut-off value, that feature is selected. In some other cases, multiple features can be clustered together either above or below the cut-off value. For the clusters below the cut-off value, the corresponding features are not selected because these features are considered not useful enough. For the clusters above the cut-off value, a single feature is selected (e.g., randomly selected) from each cluster. In some cases, a manual investigation can be made to choose top features based on the cut-off Spearman value. After feature selection, the data set is filtered with the selected features. In other words, a modified data set is formed by removing the table columns of unselected features from the data set.

The modified data set is used to determine a classifier. For generating an accurate classifier and mitigating noise effect, a number of iterations can be used, for example, 10 iterations. In each iteration, the modified data set is split into a training data set and a testing data set. As will be discussed in 112 and 114, the training data set is used to determine the classifier, while the testing data set is used to evaluate a performance of the determined classifier. In some cases, the classifier obtained from a previous iteration can be further refined by the training data set and the testing data set of a current iteration.

In some implementations, the numbers of data entries in the training data set and in the testing data set can have a ratio, e.g., a ratio of 3:1. For example, data entries in the modified data set having the class label "fix" can be divided into two groups, denoted as Group 1 and Group 2, where the numbers of data entries in Group 1 and in Group 2 have a ratio of 3:1. Similarly, data entries in the modified data set having the class label "ignore" can also be divided into two groups, denoted as Group 3 and Group 4, where the numbers of data entries in Group 3 and in Group 4 have a ratio of 3:1. Group 1 and Group 3 are merged to form the training data set, while Group 2 and Group 4 are merged to form the testing data set.

Various sampling methods can be used to split the modified data set and generate a balanced training data set and a balanced testing data set (i.e., the data set has a similar number of data entries for each class). For example, a stratified sampling method or a stratified-k-fold sampling method can be used for splitting the modified data set. The idea of the stratified sampling method is to use a probabilistic sampling to divide an entire population into different strata which are randomly chosen but balanced and proportional. The stratified-k-fold sampling method is different from the stratified sampling method because the stratified-k-fold sampling method generates more than a single fold of the stratified sampling.

At 112, the classifier uses the training data set to learn the patterns of fixed warning messages and ignored warning messages. The data entries of the training data set (i.e., values of selected features) and the associated class labels are provided to the classifier so that the classifier can learn patterns of mapping from the feature values to the class label. The classifier can use Random Forest Classification (RFC) or any other machine learning algorithms. In some cases, sampling methods discussed in 106 can be used if the training data set is an imbalanced data set. Various RFCs can be used, for example, regular RFC, balanced RFC, and weighted RFC. In some implementations, a weighted RFC can be used where different weights are applied for different classes. In some cases, the weights can be configured by a user or an algorithmic process depending on characteristics of the data set.

As discussed above, in some cases, data sets from other software programs can be used so that a new software program can have enough data entries for the classifier to learn patterns. Different combinations of the data sets from multiple software programs can be used to form the training data set and the testing data set. For example, data sets from three software programs, say X, Y, and Z, are used for the machine learning. Table 2 shows various methods to form the training data set and the testing data set, where X|Y indicates that the data set of software program X is used in training and the data set of software program Y is used in testing.

TABLE 2

Training data set and testing data set for multiple software programs

| | |
|---|---|
| Homogenous training and testing | X|X, Y|Y, Z|Z |
| Heterogeneous augmented testing | X|XY, X|XZ |
| Heterogeneous augmented training | XY|X, XZ|X |
| Heterogeneous training and testing | X|YZ |
| Heterogeneous augmented training and testing | XYZ|XY, XYZ|YZ, XYZ|XZ, XY|XY, XY|YZ |

For example, in the case of homogenous training and testing, the training data set and the testing data set are considered to be homogenous because both data sets are constructed similarly by including data entries from each software program. For instance, the data set of software program X can be split into two groups, denoted as GroupX1 and GroupX2, where the ratio of the number of entries in GroupX1 to the number of entries in GroupX2 is, e.g., 3:1. Similarly, the software program Y can be split into two groups, denoted as GroupY1 and GroupY2, with a ratio of 3:1, and the software program Z can be split into two groups, denoted as GroupZ1 and GroupZ2, also with a ratio of 3:1. As a result, the training data set is formed by merging GroupX1, GroupY1, and GroupZ1, while the testing data set is formed by merging GroupX2, GroupY2, and GroupZ2. As another example, in the case of heterogeneous training and testing, the training data set and the testing data set are considered to be heterogeneous because the two data sets are formed using data sets of different software programs. For example, the training data set includes the data set from software program X, while the testing data set includes the data sets from software programs Y and Z.

Optionally, at 114, the classifier may be tested using the testing data set to evaluate the performance of the classifier. For each data entry in the testing data set, feature values in the data entry are provided to the classifier, and the classifier outputs a predicted class label (i.e., "fix" or "ignore"). Because the class label associated with each data entry in the testing data set is known, the predicted class label is compared with the known class label to evaluate the classifier's performance. Various performance metrics can be collected, e.g., classification accuracy, precision and recall, and F-measure. Other metrics, such as confusion matrix, Cohen's Kappa, and a Receiver Operating Characteristic (ROC) curve, can also be determined.

For example, the classification accuracy can be defined as a percentage of correct predictions. For instance, assume that the testing data set has 100 data entries, and that the classifier correctly predicted the class label for 80 data entries. In that case, the classification accuracy is 80%. The performance metric of recall can be defined as a percentage of true positives among relevant instances. For example, the true positive can be the instance in which the classifier correctly predicted the class label "fix" (i.e., the predicted class label is "fix" and the known class label is also "fix"). The recall can be a percentage of true positives among the instances in which the known class label is "fix." In other words, the recall measures the percentage of correctly predicted "fix" instances out of a total of true "fix" instances. For example, assume that the testing data set has 100 data entries, and that 50 out of the 100 data entries are labelled as "fix." After running the classifier against the testing data set, the classifier predicted 40 data entries as "fix," where 30 "fix" labels were correctly predicted (i.e., the classifier predicted "fix" and the data entry is also labelled as "fix"), while the other 10 "fix" labels were incorrectly predicted (i.e., the classifier predicted "fix" but the data entry is actually labelled as "ignore"). In this case, the recall is considered to be 30/50=60%.

In some implementations, as discussed above, multiple iterations are used for classifier training and testing. The performance metrics can indicate an overall performance from the multiple iterations. For example, the recall metric can be calculated for each iteration, then an overall recall can be calculated by averaging the recalls from the multiple iterations. In some cases, sampling methods discussed in 106 can be used if the testing data set is an imbalance data set. In cases of multiple software programs, the testing data set can be formed, for example, according to Table 2.

After the classifier is tested against the testing data set, the performance metrics are analyzed. If the performance metrics do not provide an acceptable result (an acceptable result can be defined by thresholds associated with the performance metrics,), then the process 100 goes back to 106 to re-sample the data set generated at 102 (if 104 is skipped) or 104 to create a new sampled data set using a different sampling method (as discussed in 106, a number of different sampling methods can be used to mitigate the class imbalance). The new sampled data set is used for feature prediction, feature selection, classifier training, and classifier testing as described in 108-112. For example, the process 100 first used the method of over-sampling the minority class at 106, if at 114 the classifier does not provide an acceptable result (for example, the recall is lower than a threshold), the process 100 goes back to 106 and selects a different sampling method, e.g., under-sampling the majority class. The feedback process can continue until a sampling method is found that provides an acceptable result.

In some implementations, the feedback process is not used and 114 is optional. In other words, no testing data set is needed for evaluating the classifier performance, and the entire modified data set from 110 is used as the training data set.

After the classifier has been trained to learn the patterns of fixed warning messages and ignored warning messages, the classifier can be used to classify a new warning message. For example, when the software program is further developed with new codes, the FFT can generate a new warning message for the further developed software program. Values of the selected features (features selected at 110) for the new warning message are determined, for example, using the revision control tool or the FFT. The collected feature values are provided to the classifier, and the classifier outputs a class label for the new warning message. If the classifier classifies the warning message as "ignore," the warning message may not be presented to the software developers.

Figure 3:
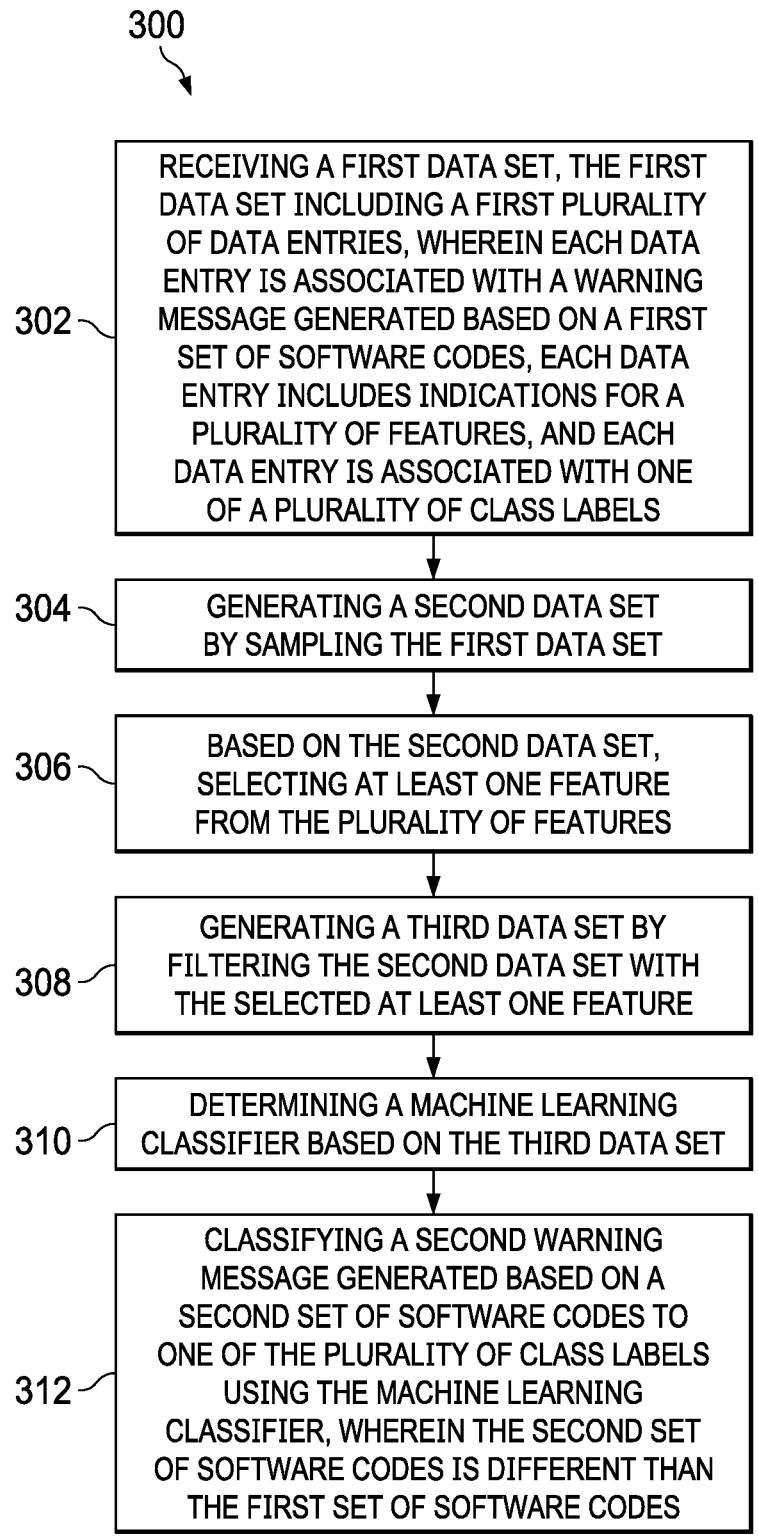
FIG. 3 is a flow diagram illustrating an example method for classifying warning messages generated by software developer tools, according to an implementation.

FIG. 3 is a flow diagram illustrating an example method 300 for classifying warning messages generated by software developer tools, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. For example, method 300 can be performed by the example computer system 400 illustrated in FIG. 4. In some implementations, various steps of method 300 can be run in parallel, in combination, in loops, or in any order.

At 302, a first data set can be received that includes a first plurality of data entries, where each data entry is associated with a warning message generated based on a first set of software codes. Each data entry includes indications for a plurality of features, and each data entry is associated with one of a plurality of class labels. For example, the first data set can be generated as described in 102 and FIG. 2. At 304, a second data set can be generated by sampling the first data set, as described in 106. At 306, based on the second data set, one or more features can be selected from the plurality of features, as described in 108 and 110. At 308, a third data set can be generated by filtering the second data set with the selected one or more features. For example, the third data set can be generated by removing feature values of unselected features. At 310, a machine learning classifier can be determined based on the third data set, as described in 112 and 114. At 312, the machine learning classifier is used to classify a second warning message generated based on a second set of software codes to one of the plurality of class labels, where the second set of software codes is different than the first set of software codes.

Figure 4:
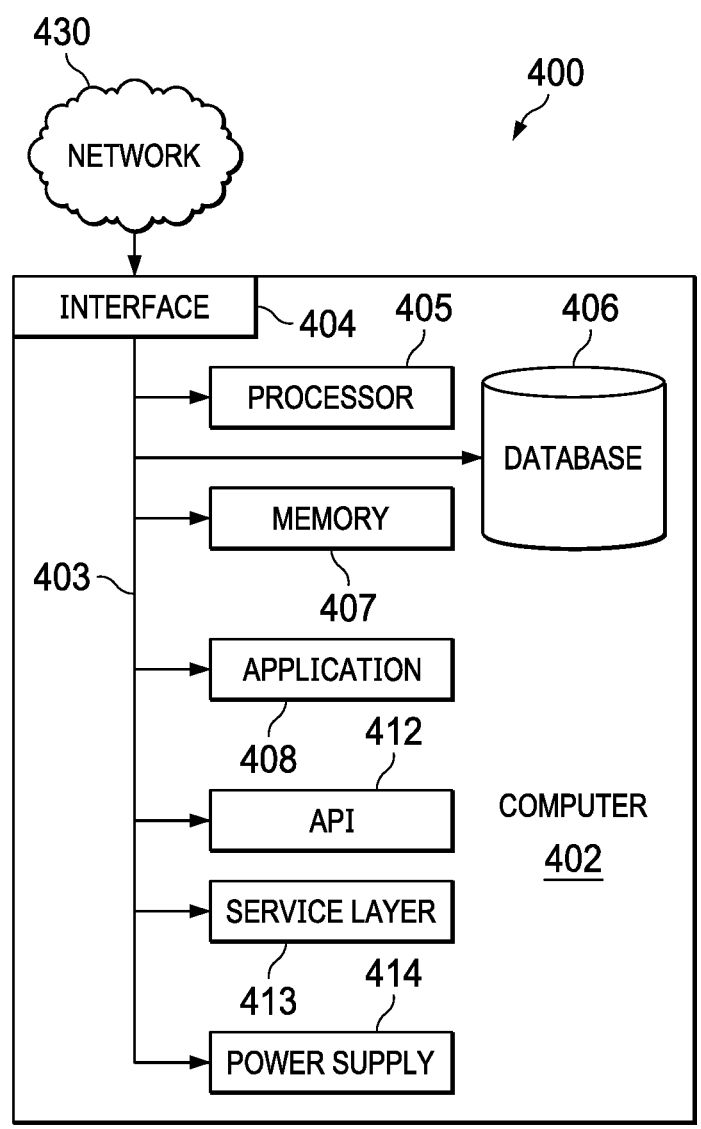
FIG. 4 is a block diagram of an example computer system used to provide computational functionalities associated with described algorithms, methods, functions, processes, flows, and procedures, as described in the instant disclosure, according to an implementation.

FIG. 4 is a block diagram of an example computer system 400 used to provide computational functionalities associated with described algorithms, methods, functions, processes, flows, and procedures, as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical-type user interface (UI) (or GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 or other components (or a combination of both) that can be connected to the network 430 (whether illustrated or not). Memory 407 can store any data consistent with this disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising:
receiving, by a hardware processor, a first data set, the first data set including a first plurality of data entries, wherein each data entry is associated with a warning message generated based on a first set of software codes, each data entry includes indications for a plurality of features, and each data entry is associated with one of a plurality of class labels;
generating, by the hardware processor, a second data set by sampling the first data set;
based on the second data set, selecting, by the hardware processor, at least one feature from the plurality of features, wherein selecting the at least one feature comprises selecting the at least one feature that is clustered above a cut-off value, wherein the cut-off value is a Spearman value;
generating, by the hardware processor, a third data set by filtering the second data set with the selected at least one feature;

determining, by the hardware processor, a machine learning classifier based on the third data set, wherein determining the machine learning classifier comprises dividing the third data set into a training data set and a testing data set; and classifying, by the hardware processor, a second warning message generated based on a second set of software codes to one of the plurality of class labels using the machine learning classifier, wherein the second set of software codes is different than the first set of software codes.

2. The method of claim 1, wherein the selecting the at least one feature comprises:
 determining that more than one feature is clustered above the cut-off value; and
 randomly selecting one feature from each cluster above the cut-off value.

3. The method of claim 1, wherein the plurality of class labels includes a first class label for fixing the warning message and a second class label for ignoring the warning message.

4. The method of claim 1, wherein the first data set is an imbalanced data set.

5. The method of claim 1, wherein the plurality of features includes features associated with at least one of a software development process, a programming code, a software code change, or a fault finding tool analysis.

6. The method of claim 5, wherein at least one of a stratified sampling or a stratified K-fold sampling is applied to the training data set.

7. A device, comprising:
 a memory; and
 at least one hardware processor communicatively coupled with the memory and configured to:
  receive a first data set, the first data set including a first plurality of data entries, wherein each data entry is associated with a warning message generated based on a first set of software codes, each data entry includes indications for a plurality of features, and each data entry is associated with one of a plurality of class labels;
  generate a second data set by sampling the first data set;
  based on the second data set, select at least one feature from the plurality of features, wherein selecting the at least one feature comprises selecting the at least one feature that is clustered above a cut-off value, wherein the cut-off value is a Spearman value;
  generate a third data set by filtering the second data set with the selected at least one feature;
  determine a machine learning classifier based on the third data set, wherein determining the machine learning classifier comprises dividing the third data set into a training data set and a testing data set; and
  classify a second warning message generated based on a second set of software codes to one of the plurality of class labels using the machine learning classifier, wherein the second set of software codes is different than the first set of software codes.

8. The device of claim 7, wherein the selecting the at least one feature comprises:
 determining that more than one feature is clustered above the cut-off value; and
 randomly selecting one feature from each cluster above the cut-off value.

9. The device of claim 7, wherein the plurality of class labels includes a first class label for fixing the warning message and a second class label for ignoring the warning message.

10. The device of claim 7, wherein the first data set is an imbalanced data set.

11. The device of claim 7, wherein the plurality of features includes features associated with at least one of a software development process, a programming code, a software code change, or a fault finding tool analysis.

12. The device of claim 11, wherein at least one of a stratified sampling or a stratified K-fold sampling is applied to the training data set.

13. A non-transitory computer-readable medium containing instructions which, when executed, cause a computing device to perform operations comprising:
 receiving a first data set, the first data set including a first plurality of data entries, wherein each data entry is associated with a warning message generated based on a first set of software codes, each data entry includes indications for a plurality of features, and each data entry is associated with one of a plurality of class labels;
 generating a second data set by sampling the first data set;
 based on the second data set, selecting at least one feature from the plurality of features, wherein selecting the at least one feature comprises selecting the at least one feature that is clustered above a cut-off value, wherein the cut-off value is a Spearman value;
 generating a third data set by filtering the second data set with the selected at least one feature;
 determining a machine learning classifier based on the third data set, wherein determining the machine learning classifier comprises dividing the third data set into a training data set and a testing data set; and
 classifying a second warning message generated based on a second set of software codes to one of the plurality of class labels using the machine learning classifier, wherein the second set of software codes is different than the first set of software codes.

14. The non-transitory computer-readable medium of claim 13, wherein the selecting the at least one feature comprises:
 determining that more than one feature is clustered above the cut-off value; and
 randomly selecting one feature from each cluster above the cut-off value.

15. The non-transitory computer-readable medium of claim 13, wherein the plurality of class labels includes a first class label for fixing the warning message and a second class label for ignoring the warning message.

16. The non-transitory computer-readable medium of claim 13, wherein the first data set is an imbalanced data set.

17. The non-transitory computer-readable medium of claim 13, wherein the plurality of features includes features associated with at least one of a software development process, a programming code, a software code change, or a fault finding tool analysis.

* * * * *